Dec. 27, 1960 W. ALTSTAEDT ET AL 2,966,533
PRODUCTION OF ACETYLENE BY PARTIAL OXIDATION
OF HYDROCARBONS AND APPARATUS THEREFOR
Filed Oct. 8, 1958
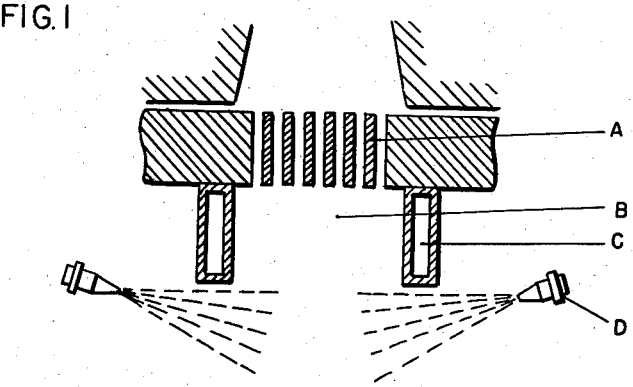
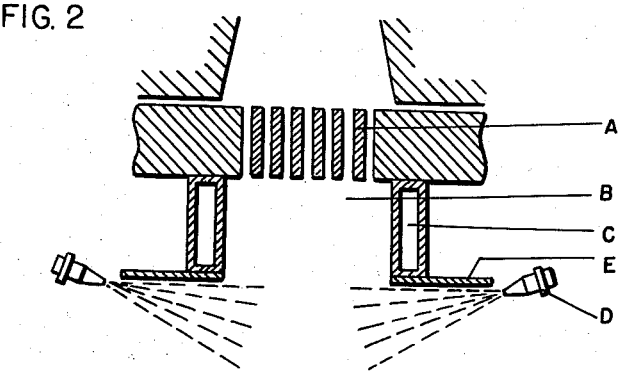
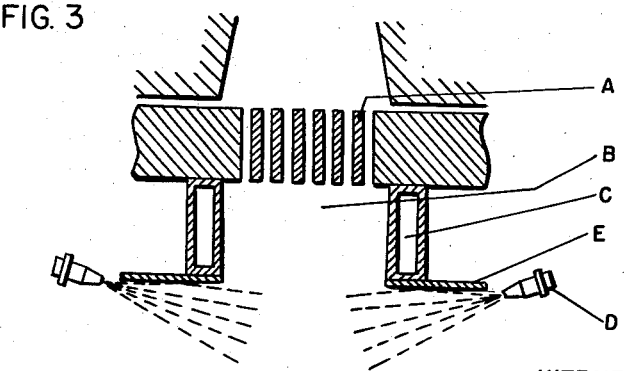
INVENTORS:
WERNER ALTSTAEDT
ERWIN LEHRER
FRIEDRICH WILHELM SCHIERWATER
BY
*Margall, Johnston, Cook & Root*
ATT'YS

United States Patent Office 2,966,533
Patented Dec. 27, 1960

2,966,533
PRODUCTION OF ACETYLENE BY PARTIAL OXIDATION OF HYDROCARBONS AND APPARATUS THEREFOR

Werner Altstaedt, Ludwigshafen (Rhine), Erwin Lehrer, Bad Duerkheim, and Friedrich Wilhelm Schierwater, Ludwigshafen (Rhine), Germany, assignors to Badische Anilin- & Soda-Fabrik Aktiengesellschaft, Ludwigshafen (Rhine), Germany Filed Oct. 8, 1958, Ser. No. 766,123

Claims priority, application Germany Nov. 22, 1957

2 Claims. (Cl. 260—679)

This invention relates to improvements in the production of acetylene and apparatus therefor.

It is known to prepare acetylene by partial oxidation of gaseous or vaporized hydrocarbons with oxygen by preheating the reactants together or separately, supplying the mixture to the reaction chamber, reacting them in a flame and rapidly cooling the reaction gases at a point of time when the maximum amount of acetylene is present in the gas mixture. The quenching is preferably effected by spraying water into the gas mixture after it leaves the reaction chamber.

The water sprayed in a plane perpendicular to the direction of flow constitutes a considerable resistance to flow for the gas so that a part of the gas leaves laterally between the outlet opening of the reaction chamber and the plane of spraying. This part of the gas is therefore not cooled at the right time and the consequence is that the acetylene contained therein partly decomposes with the formation of carbon black. The yield of acetylene is thereby appreciably impaired, while the troublesome carbon black content of the gas is increased.

Attempts have been made to avoid this inconvenience by an arrangement such as that shown diagrammatically in Figure 1 of the accompanying drawings. The preheated mixture of hydrocarbon and oxygen is led downwardly through a burner block A provided with parallel channels into a reaction chamber B bounded by a water-cooled jacket C, the reaction proceeding in the reaction chamber B with the formation of a flame. Closely beneath the outlet opening of the reaction chamber, there is arranged a ring of jets D from which finely dispersed water is sprayed in transversely to the current of gas. When working in this way, a very accurate adjustment of the jets is necessary. If the jets are arranged too high, the water may gain access to the reaction chamber by the stream thereof striking the inner wall opposite to the jet, or a part of the water may not be utilized because it strikes the wall of the reaction chamber situated between the jet—assumed to be wrongly adjusted—and the current of gas. When the arrangement of the jets is too low, no effective lateral seal with water is ensured. However, even with the most accurate adjustment of the jets, it cannot be avoided with this arrangement that a part of the reaction gas escapes from the reaction chamber still in the hot state and consequently the acetylene contained in this part is substantially decomposed.

We have now found that the said difficulties can be obviated by introducing the water at the end of the reaction chamber substantially parallel to a flat wall arranged on the reaction chamber perpendicular to the current of gas, the distance between the water spray and the wall being kept so small that the gas present in this intermediate space is entrained in the direction of the water. In this way any lateral exit of any part of the gas is prevented with certainty.

Figure 2 of the accompanying drawings shows diagrammatically a preferred apparatus for carrying out this process. The gas, as in the known arrangement according to Figure 1, flows down through the channels of the burner block A into the reaction chamber B. At the lower end of the jacket C of the reaction chamber B a flat annular plate E is secured and the quenching water is sprayed in parallel to this plate E from a ring of jets D.

It has been found that an effective lateral seal may also be achieved when the water is not supplied exactly parallel to the plate but strikes the plate at a small angle. A trivial mal-adjustment of the jets used for spraying, such as may readily occur, is therefore unimportant with this arrangement. This modification is shown in Figure 3.

The most favorable size for the plate or wall has proved to be between 80 and 200 millimeters, preferably between 100 and 150 millimeters, measured in radial direction outwardly from the inner opening. This dimension ensures on the one hand a sufficient seal for the gas and on the other hand the spray jets are not situated at too great a distance from the gas current.

The following example will further illustrate this invention but the invention is not restricted to this example.

Example 800 cubic meters (NTP) per hour of methane are heated in a preheater to a temperature of 640° C. and 450 cubic meters (NTP) per hour of oxygen are heated in a second preheater, also to a temperature of 640° C. The hot gases are supplied to a mixing device. After complete mixing, the mixture passes through the parallel channels of the burner block A in the apparatus shown in the Figure 1 into the reaction chamber B where the methane reacts with the oxygen with the formation of a flame. The reaction gases are cooled by spraying in water at the outlet opening of the reaction chamber through a ring of jets D. A gas mixture is obtained which contains 8.3% by volume of acetylene and carries with it 3.0 grams of carbon black per cubic meter.

The process is carried out under the same conditions in the apparatus shown in Figure 2 in which the reaction chamber B is provided at the outlet opening with an annular plate E having a radial dimension of 125 millimeters. A gas mixture is obtained which contains 8.5% by volume of acetylene and carries with it 1.77 grams of carbon black per cubic meter.

We claim:

1. In an apparatus for the production of acetylene including a reaction chamber in which gaseous hydrocarbons are partially oxidized and a plurality of water-spraying jets arranged externally of said reaction chamber and around the outlet opening thereof to rapidly cool the gas stream leaving said opening by a spray of water directed transversely inwardly of the gas stream, the improvement which comprises an annular plate extending outwardly from said outlet opening of said reaction chamber, said plate having a flat wall substantially perpendicular to the gas stream leaving said opening, and a plurality of water-spraying jets mounted adjacent said flat wall such that the water spray therefrom slightly impinges on said wall, said jets being spaced outwardly from said opening at a distance sufficient to entrain in the water spray any gas passing laterally outwardly between said wall and said jets.

2. In a process for the production of acetylene wherein gaseous hydrocarbons are partially oxidized in a reaction zone and the resulting gas is rapidly cooled by spraying water transversely inwardly upon the gas stream leaving the outlet of said reaction zone, the improvement which comprises directing said water spray to slightly impinge upon a flat boundary surface extending outwardly from the outlet of said reaction zone and substantially perpendicular to said gas stream, the distance which the water spray travels along said boundary surface being sufficient to entrain in the water spray any gas passing laterally outwardly from the gas stream.

References Cited in the file of this patent

UNITED STATES PATENTS

| | | |
|---|---|---|
| 2,679,542 | Dorsey | May 25, 1954 |
| 2,719,184 | Kosbahn et al. | Sept. 27, 1955 |
| 2,731,466 | Heffner | Jan. 17, 1956 |
| 2,750,434 | Krejci | June 12, 1956 |
| 2,817,690 | Lobo | Dec. 24, 1957 |

FOREIGN PATENTS

| | | |
|---|---|---|
| 520,578 | Belgium | Dec. 9, 1953 |